Figure 1:
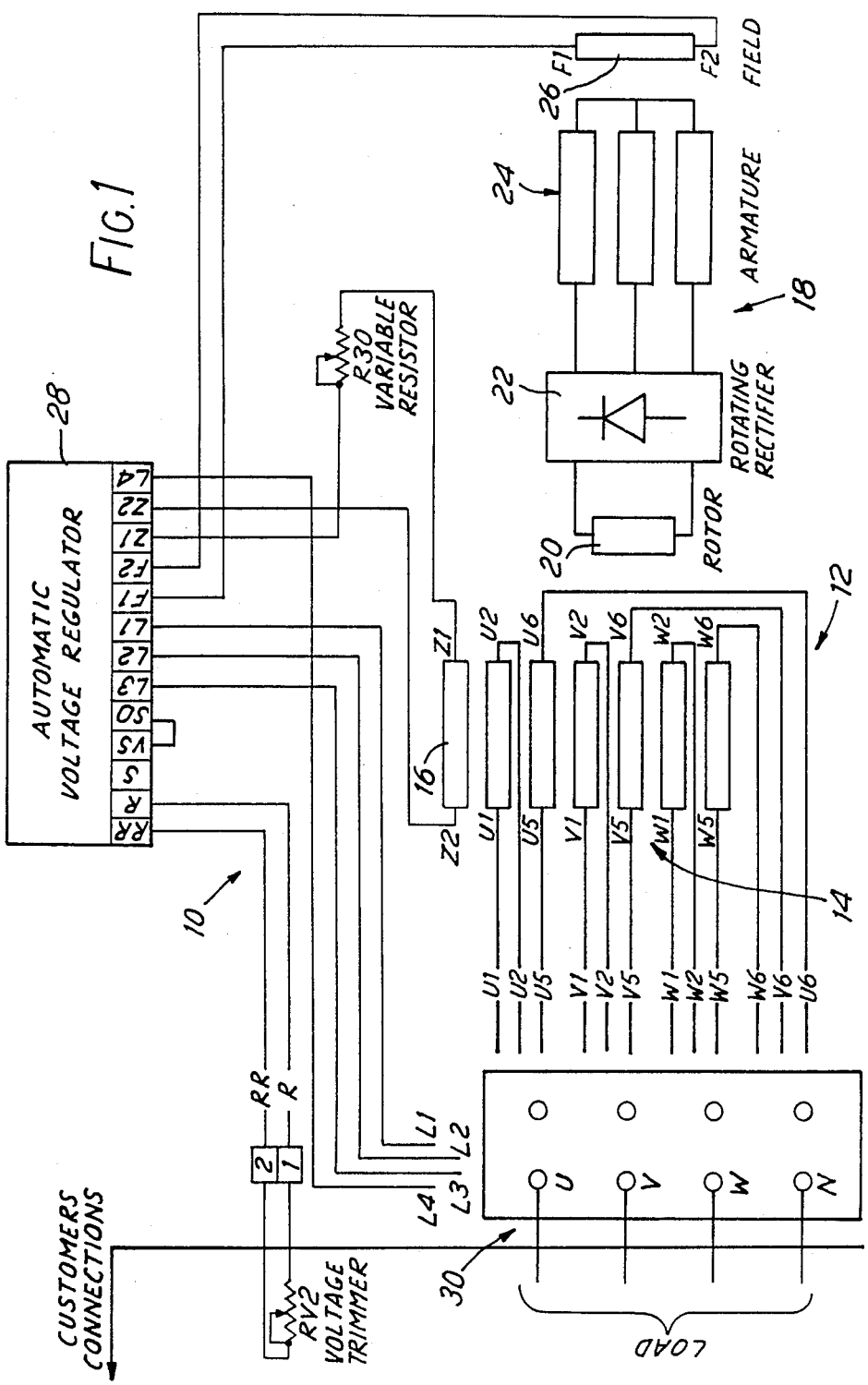

United States Patent [19]

Rounce

[11] Patent Number: 4,728,879
[45] Date of Patent: Mar. 1, 1988

[54] AUTOMATIC VOLTAGE REGULATOR

[76] Inventor: William J. Rounce, 24, Cumberland Gardens, Castle Bytham, Grantham, Lincs., England

[21] Appl. No.: 872,976

[22] Filed: Jun. 11, 1986

[30] Foreign Application Priority Data

Jun. 12, 1985 [GB] United Kingdom ............ 8514859

[51] Int. Cl.$^4$ .............................................. H02P 9/30
[52] U.S. Cl. ......................................... 322/25; 322/58; 322/68
[58] Field of Search ................. 322/25, 28, 32, 58, 322/60, 63, 68; 318/140, 154, 158

[56] References Cited

U.S. PATENT DOCUMENTS

| | | | |
|---|---|---|---|
| 4,047,095 | 9/1977 | Wijnterp | 322/25 X |
| 4,442,396 | 4/1984 | Hucker | 322/25 X |
| 4,463,306 | 7/1984 | de Mello et al. | 322/25 |
| 4,496,897 | 1/1985 | Unnewehr et al. | 322/25 |

Primary Examiner—Peter S. Wong
Attorney, Agent, or Firm—Frijouf, Rust & Pyle

[57] ABSTRACT

A self-excited brushless AC generator as a single or polyphase main winding, a generator field winding, an exciter device for drawing current from the main winding for energizing the generator field winding when the main winding is under no load and normal load conditions and an auxiliary exciter system responsive to the generation of a harmonic of the generator fundamental flux to supply current to the exciter device for energizing the field winding when the main winding is under short circuit conditions. The auxiliary exciter system has an auxiliary winding wound with the main winding so as to be responsive to generation of the harmonic flux and an automatic voltage regulator. The regulator has a first input coupled to the auxiliary winding, a second input coupled to an output of the generator and an output coupled to an exciter field winding which is inductively coupled to an armature winding of the exciter device. The automatic voltage regulator is operable to control excitation of the exciter field winding in dependence on the outputs of the auxiliary winding and the generator.

10 Claims, 2 Drawing Figures

AUTOMATIC VOLTAGE REGULATOR

CROSS-REFERENCE TO RELATED APPLICATIONS

This application claims priority to United Kingdom application Ser. No. 8514859 filed June 12, 1985. All matter set forth in the United Kingdom application No. 8,514,859 is hereby incorporated by reference within the present application.

The present invention relates to an automatic voltage regulator, particularly for use with self-excited brushless AC generators.

Self-excited brushless AC generators generally comprise a stationary armature which is excited by a rotating field winding mounted on the generator motor to generate a rotating salient pole field. Current is supplied to the rotating field winding by way of rectifiers from a winding of an exciter device, which winding is rotatable with the rotor. The current is induced in this winding as it rotates in a magnetic field generated by a field winding whose current is supplied from the main armature winding providing the generator output current and is controlled by a voltage regulator.

In certain circumstances and especially, for example, to meet some marine specifications, steady-state fault output currents of up to 3 or 5 times normal full load current are required usually to ensure satisfactory operation of current-activated safety and discrimination devices when the generator output is short-circuited.

In a previously known type of generator which operates normally under no load and load conditions, short-circuiting of the generator output causes the excitation current supplied to the exciter field winding to fall to zero. With no excitation current the output current of the generator also drops to zero and the generator is therefore inherently incapable of providing any sustained short-circuit current.

The applicant's U.S. Pat. No. 2,071,430 describes and claims a self-excited brushless AC generator which overcomes this disadvantage by using an auxilliary stator winding selectively to harness third-harmonic flux present in the field-form of a short-circuited salient-pole AC generator to provide an independent source of exciter to the power. The auxilliary stator winding is wound with the generator main stator winding and is so pitched and distributed as to respond substantially only to any third-harmonic flux component of the generator fundamental field. The output from this auxilliary winding is rectified and fed either to the normal single exciter field winding, via a "matching" transformer or to a separate auxilliary field winding. Over the normal load range the auxilliary stator winding output is relatively small, since although there is always some third-harmonic flux present it is seldom a large enough component for the triple-frequency voltage it induces in the auxilliary winding significantly to effect the normal controlled operation of the generator's principal shunt-excited excitation system. In the event of a generator terminal short-circuit, however, when there is very little fundamental flux, the third-harmonic flux component increases considerably and the auxilliary excitation winding provides all the exciter field power required to sustain any reasonable short-circuit current for the few seconds required for the protective devices to operate. During normal operation of the generator excitation current is supplied to the exciter field winding via a voltage regulator from the output of the main armature winding.

Although the above arrangement has proved satisfactory and effective it does require additional control equipment which add to the weight and cost of the generator.

The present invention seeks to provide an improved form of automatic voltage regulator.

Accordingly, the present invention provides an automatic voltage regulator for a self-excited brushless AC generator, comprising first input means for receiving a first input signal representative of the output of the generator, second input means for receiving a signal representative of the magnitude of the third-harmonic flux component produced by the generator, output means for connection to an exciter field winding of the generator, and means for providing an output control signal in dependence on the signal level at said first and second input means.

Accordingly, the present invention also provides a self-excited brushless AC generator having a single or polyphase main winding; a generator field winding therefor; an exciter device arranged to draw current from said main winding for energizing said generator field winding when said main winding is under no load and load conditions; and an auxilliary exciter system responsive to generation of a harmonic of the generator fundamental flux to supply current to said exciter device for energizing said field winding when said main winding is under short circuit conditions; wherein said auxilliary exciter system comprises an auxilliary winding wound with said main winding so as to be responsive to generation of said harmonic flux, an automatic voltage regulator having a first input coupled to said auxilliary winding, a second input coupled to an output of the generator and an output coupled to an exciter field winding which is inductively coupled to an armature winding of said exciter device, said automatic voltage regulator being operable to control excitation of said exciter field winding in dependence on the outputs of said auxilliary winding and said generator.

Figure 2:
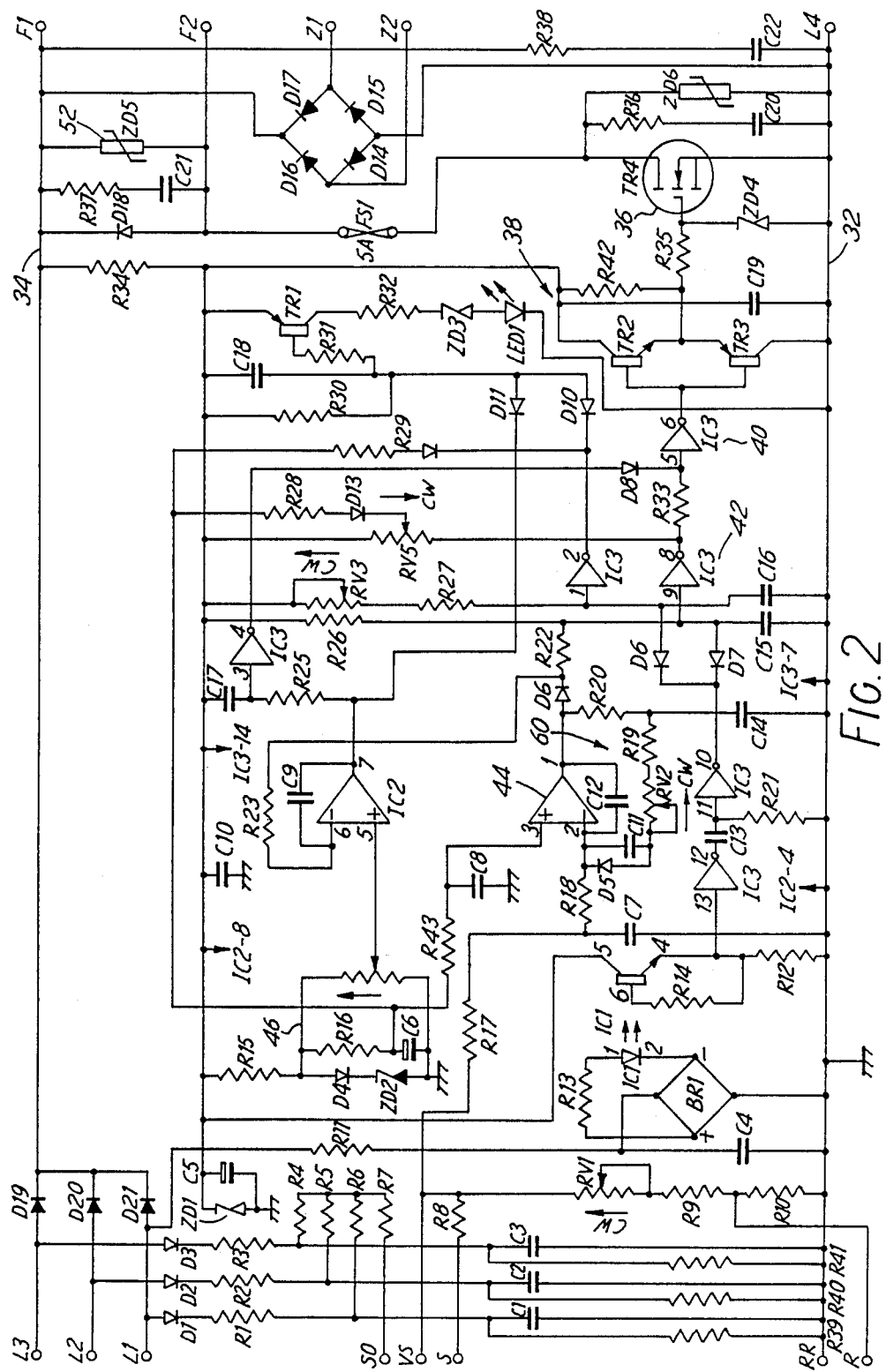

The present invention further described hereinafter, by way of example, with reference to the accompanying drawings, in which:

FIG. 1 diagrammatically illustrates one embodiment of a brushless AC generator according to the present invention; and FIG. 2 is a circuit diagram of the automatic voltage regulator of FIG. 1.

Similar reference characters refer to similar parts throughout the several views of the drawings.

Referring to the drawings, these show a four-pole brushless AC generator 10 whose stator 12 has a main armature winding 14 with a single phase concentric auxilliary winding 16. The generator has a rotor which carries an excitation system 18 comprising a main field winding 20 which is supplied with current via a rectifier system 22 from an armature winding 24. The latter is acted upon by a magnetic field produced by an exciter field winding 26 which, under normal operating conditions, receives current via a voltage regulator 28 from the output lines 30 of the main armature winding 14. The automatic voltage regulator 28 also has an input connected to the auxilliary winding 16. For further details of the auxilliary winding 16 reference should be made to the Applicant's earlier published U.S. Pat. No. 2,071,430.

Referring now to FIG. 2, this shows a circuit diagram of the automatic voltage regulator. This has a first input Z1,Z2 which is connected to the auxilliary winding 16. Output from the winding 16 is rectified in the voltage regulator and applied across voltage rails 32 and 34, the latter being connected to one terminal of the regulator output F1,F2. The second terminal of the regulator output is coupled to the voltage rail 32 through a MOSFET 36 whose gate is driven by a complimentary emitter follower 38. The input of this is coupled through inverter gates 40, 42 to the output of a comparator 44. The comparator has a non-inverting input which is connected to a reference voltage source 46 and an inverting input which is connected through a smoothing circuit 48 and rectifiers 50 to the three phase output lines of the generator. The comparator serves to compare the rectified and filtered output voltage of the generator with a reference voltage and controls the MOSFET 36 in dependence on this comparison.

During normal operation, the comparator 44 controls the Power MOSFET 36 in a pulse width modulation mode which allows variable rectified voltage from the generator output to be applied to the field winding 16 through the regulator output F1, F2.

When the output of the generator is short circuited, the voltage applied to the inverting input of the comparator 44 drops, resulting in maximum conduction demand on the power MOSFET 36 which now applies the rectified voltage from the auxilliary winding Z1, Z2 to the regulator output terminals F1, F2, and thus to the exciter field winding 26 in order to maintain excitation and provide a generator short-circuit current.

Terminals L1,L2,L3 are normally connected to 120 volt 3 phase tappings in the generator, referenced to L4, which is connected to neutral. The exciter field is connected to F1, F2 and the triplidex auxilliary winding to Z1, Z2. VS and SO are normally linked which connects the internal voltage sensing network. The regulator may also be used with external sensing by disconnecting VS, SO and feeding the external signal into S and RR. Remote voltage trimming is possible by connecting a potentiometer across terminals R, RR. These terminals are normally linked if external trimming is not required.

Under normal conditions the power supply for the exciter is provided by diodes D19-D21 which half wave rectifies the 3 phase supply. Under generator short circuit conditions, voltage is available at terminals Z1, Z2 which is rectified by diodes D14-D17. The power MOSFET TR4 controls the voltage output to the exciter at all times with D18 acting as a freewheel diode for inductive exciter current. MOSFET 36 and D18 are protected from high dv/dt voltage spikes by components R36 C20 ZD4 ZD6, R37 C21 ZD5 and R38 C22.

To control the output voltage the power MOSFET 36 is pulse width modulated (PWM), as a saturated switch. The PWM waveform is obtained by using Schmitt trigger gates as level detectors and varying amplitude positive slope ramps. The ramp to control MOSFET 36 is generated at the junction of R26 C15 and is synchronized to the line frequency by an opto-isolation circuit comprising of BR1 R13 IC1 R14 R12 C13 R21 D7 and Schmitt gates pins 13 12 11 10. R11 C4 provide a filtered supply for this circuit. The main comparator 44 controls the amplitude of the ramp. IC3 pins 9 8 11 10 generate the PWM pulse by detecting any part of the ramp that exceeds 5 volts approximately. The output of inverter 40 then, will be a varying pulse width depending on the output amplitude of comparator 44. TR2 and 3 are complementary emitter followers which provide a low impedance drive for MOSFET 36. C19 is for local decoupling.

The main comparator 44 has a negative temperature coefficient voltage reference on its non-inverting input, provided by R15, D4, ZD2. During start up, this reference voltage charges exponentially across C6 R43 C8 to give a soft start characteristic on the generator voltage.

The generator voltage sensing circuit is applied to the inverting input of the comparator 44. Voltage is rectified, filtered and divided by components D1-3, R1-7, C1-3. The voltage applied to the comparator is adjustable through RV1 which is connected in a fail safe manner should the wiper go open circuit, i.e. this will cause the generator volts to fall. Further filtering is provided by R17 C7 before being applied to the comparator 44 through R18.

Dynamic stability of the regulator 28 is controlled by an adjustable lag lead network 60 around the comparator 44 comprising of R20 C14 R19 RV2 C11. D5 limits the charge on C11 to guarantee fast recovery from overload conditions.

A protection circuit is included in the regulator to cut the excitation in event of severe overload. To sense the overload condition, IC2 pins 5 6 7 are used as a second comparator 62 with the non-inverting input being supplied from an adjustable reference voltage RV4. The inverting input senses the output amplitude of the main PWM generator. R23 and C9 integrating the detected signal. The output of comparator 62 goes "low" when the voltage at its inverting input is greater than at its non-inverting input. Transistor 64 coupled to the output of comparator 62 is turned on via D11 R31 and illuminates LED1 through ZD3 to give an indication of the overload. If this overlaod condition persists for more than about 8 seconds then C17 will have changed sufficiently through R25 for IC3 pin 4 to change state 2 to a "high". D8 steers this "high" to IC3 pin 5 which resutls in permanent removal of gate drive to MOSFET 36 until the generator is stopped.

An underspeed protection circuit is provided to reduce the generator voltage proportional to speed below a preset threshold. The underspeed threshold setting is adjusted by RV3 which controls the amplitude of the speed ramp formed at the junction of R27 C16. D8 synchronizes this ramp to the line frequency using the opto-coupled circuit as described previously. As generator frequency descreases the periodic cycle time increases and allows the amplitude of the speed ramp to exceed the threshold of IC3 pin 1. This causes the output of IC3 pin 2 to produce a negative pulse width which represents the amount of underspeed. D12 and R29 steer this negative signal back to the reference voltage causing it to reduce in proportion to the underspeed. D10 also accepts the negative signal and converts the pulses into a DC signal with C18 to provide continuous base drive for TR1 to illuminate LED1 and give indication of the underspeed condition.

A droop circuit is provided to enable generators to run in parallel with each other and share the reactive current. The circuit used relies on the fact that generator excitation increases at lower (more lagging) power factors. RV5 controls the amount of droop and is connected to the output of IC3 pin 8, where PWM pulses are present. As excitation increases the PWM output at this point becomes more negative. D13 and R28 return a portion of this negative signal back to the voltage reference on C6 which causes the generator voltage to droop with increasing excitation. If parallel operation is not required, RV5 may be turned fully anti-clockwise totally to remove the droop circuit.

The power supply is provided by R34 ZD1 and C5.

As will be appreciated, the regulator serves both the function of automatically regulating the generator output voltage under normal operating conditions and also supplying an excitation current to the exciter field winding when the generator output is short-circuited.

I claim:

1. An automatic voltage regulator for a self-excited brushless AC generator, comprising first input means for receiving a first input signal representative of an output of the generator, second input means for receiving a second input signal representative of the magnitude of the third-harmonic flux component produced by the generator, and output means for producing a regulator output for connection to an exciter field winding of the generator, said regulator output being dependent on the level of said first input signal and said second input signal.

2. A regulator as claimed in claim 1 wherein said output means comprises a first comparator for comparing said first input signal with a reference signal and providing said output in dependence on the comparison.

3. A voltage regulator as claimed in claim 2 wherein said first comparator is coupled to said output means by switching means.

4. A voltage regulator as claimed in claim 3 further comprising means for generating a pulse signal in dependence on an output signal of said first comparator and applying said pulse signal to said switching means.

5. A voltage regulator as claimed in claim 4 wherein said means for generating a pulse signal is operable to vary the width of said pulse signal dependent on said output signal of said first comparator.

6. A voltage regulator as claimed in claim 1 further comprising overload protection means for reducing said output in response to said first input signal exceeding a predetermined level.

7. A voltage regulator as claimed in claim 6 wherein said overload protection means comprises a second comparator for comparing said output with a reference signal and controlling said output in dependence on the comparison.

8. A voltage regulator as claimed in claim 1 further comprising underspeed protection means for reducing the level of said output in response to an underspeed signal representing a generator speed below a preselected level.

9. A voltage regulator as claimed in claim 8 wherein said underspeed control means comprises means for monitoring said output and operable to reduce said first input signal in response to said output exceeding a preselected level, to reduce said output.

10. A self-excited brushless AC generator having a single or polyphase main winding; a generator field winding therefor; an exciter device arranged to draw current from said main winding for energizing said generator field winding when said main winding is under no load and normal load conditions; and an auxiliary exciter system responsive to generation of a harmonic flux of a fundamental flux in said main winding to supply current to said exciter device for energizing said field winding when said main winding is under short circuit conditions; wherein said auxilliary exciter system comprises an auxilliary winding wound with said main winding so as to be responsive to generation of said harmonic flux, an automatic voltage regulator having a first input coupled to an output of the generator and an output coupled to an exciter field winding which is inductively coupled to an armature winding of said exciter device, said automatic voltage regulator being operable to control excitation of said exciter field winding in dependence on the outputs of said auxilliary winding and said generator.

* * * * *